(12) United States Patent
Nierescher et al.

(10) Patent No.: US 9,533,839 B2
(45) Date of Patent: Jan. 3, 2017

(54) MATERIAL HANDLING SYSTEM

(71) Applicant: Centurion Medical Products Corporation, Williamston, MI (US)

(72) Inventors: Jason Nierescher, Durand, MI (US); David Taylor, Delafield, WI (US)

(73) Assignee: Centurion Medical Products Corp., Williamston, MI (US)

( * ) Notice: Subject to any disclaimer, the term of this patent is extended or adjusted under 35 U.S.C. 154(b) by 129 days.

(21) Appl. No.: 14/266,092

(22) Filed: Apr. 30, 2014

(65) Prior Publication Data

US 2014/0328633 A1  Nov. 6, 2014

Related U.S. Application Data

(60) Provisional application No. 61/818,652, filed on May 2, 2013.

(51) Int. Cl.
*B65G 53/60* (2006.01)
*B65G 53/14* (2006.01)
*B65F 5/00* (2006.01)

(52) U.S. Cl.
CPC ............... *B65G 53/14* (2013.01); *B65F 5/005* (2013.01)

(58) Field of Classification Search
CPC ........................... B65G 53/24; B65G 53/4682
USPC ........... 406/28, 93, 157, 158, 159, 160, 161, 162, 406/163, 169
See application file for complete search history.

(56) References Cited

U.S. PATENT DOCUMENTS

| | | | | |
|---|---|---|---|---|
| 2,705,664 A | * | 4/1955 | McClure | B01J 8/0065 406/163 |
| 3,489,464 A | * | 1/1970 | Delfs | B65G 53/00 406/109 |
| 3,874,860 A | * | 4/1975 | Larsson | B65G 53/62 209/10 |
| 5,785,464 A | * | 7/1998 | May, III | B29C 45/18 406/163 |
| 6,068,429 A | * | 5/2000 | Schultheis | B65G 53/60 406/157 |
| 6,619,525 B2 | | 9/2003 | Frankeburger et al. | |
| 6,634,833 B2 | * | 10/2003 | Gillespie | B65G 53/58 406/168 |
| 6,789,715 B2 | | 9/2004 | Frankeburger et al. | |

(Continued)

OTHER PUBLICATIONS

Website http://www.converteraccessory.com/lit_down/lit_down.php#fox Dated Mar. 21, 2013, Retrieved from the Wayback Machine Jun. 6, 2014, "Fox Trim Away Division Pneumatic Conveying Systems".

(Continued)

*Primary Examiner* — Joseph Dillon, Jr.
(74) *Attorney, Agent, or Firm* — Kristin L. Murphy; Brooks Kushman P.C.

(57) ABSTRACT

A material collection unit for a material handling system is disclosed. The material collection unit includes an elongated housing section, a separator, and an accumulation bin. The separator is disposed within the housing section and partially bisects the elongated housing section into first and second sections. The first section is in communication with an inlet for materials to pass through. The second section is in communication with an exhaust. The accumulation bin is disposed below the elongated housing and has an open top section that is in communication with the elongated housing section and a second opening that is configured to mate with an opening of a baler unit.

13 Claims, 10 Drawing Sheets

(56) References Cited

U.S. PATENT DOCUMENTS

| | | | |
|---|---|---|---|
| 6,942,133 B2 | 9/2005 | Frankeburger et al. | |
| 6,994,497 B1 * | 2/2006 | Eriksson | B01J 8/0005 406/124 |
| 7,228,990 B2 * | 6/2007 | Schmidt | B28C 5/40 141/83 |
| 7,972,087 B2 * | 7/2011 | Davison | A22C 21/0053 222/410 |
| 8,113,745 B2 * | 2/2012 | Aoki | B65G 53/525 406/126 |
| 8,684,636 B2 * | 4/2014 | Dunstan | A01C 7/081 111/175 |
| 8,876,439 B2 * | 11/2014 | Sheehan | B01J 8/0015 198/534 |
| 9,187,266 B2 * | 11/2015 | Sundholm | B65G 53/26 |
| 9,199,804 B2 * | 12/2015 | Hughes | G01F 11/24 |

OTHER PUBLICATIONS

Baler and Compaction Equipment, Jan. 2012, "Model V63HD, Vertical Baler."

* cited by examiner

FIG. 7B

MATERIAL HANDLING SYSTEM

CROSS-REFERENCE TO RELATED APPLICATION

This application claims priority to U.S. Provisional Patent Application No. 61/818,652, filed May 2, 2013, the disclosure of which is incorporated by reference in its entirety.

TECHNICAL FIELD

The present disclosure generally relates to a material handling system for conveying flexible articles to a collector unit. In one exemplary configuration, a material handling system for conveying flexible waste materials for efficient disposal is proposed.

BACKGROUND

In certain commercial or industrial settings, handling of large volumes of flexible articles is required. As one non-limiting example, in a hospital setting, soiled linens are deposited in flexible waste bags, which are secured closed to contain bodily fluids within the waste bag, as well as to minimize undesirable odors emanating from the waste bags. However, to facilitate removal of the laundry from the waste bags, the most efficient manner is to tear the bags open, rather than attempt to untie the bags. The used waste bags are then discarded in a bin. However, as waste removal costs are high, it is desirable for the waste bags to be compacted and bundled together in a cost-effective manner for efficient removal. Currently, the waste bags are accumulated in a bin, which must be manually transported to a remotely located baler machine to compact and bundle the waste bags together in an efficient and manageable size.

While the extra time and manpower that manually transporting the waste bags is an issue that needs to be resolved, there also exists a need for determining when a baler should be operated to maximize efficiency. In other words, using the waste bag example above, current systems do not have an arrangement that is configured to maximize the number of waste bags to be compacted and bundled together in a given bundle. Thus, the current baling operations are not operating at maximum efficiencies.

In the context of laundry facilities that involve flexible articles such as textiles, which touch patients/employees directly or indirectly in a healthcare facility, there are certain standards that must be met for the protection of patients/employees, as well as to minimize exposure to bacteria and disease. For example, the Healthcare Laundry Accreditation Council (HLAC) is the authority on laundry standards for the preparation of hygienically clean, reusable healthcare textiles for patient care and offers a voluntary accreditation to those laundry facilities processing reusable healthcare textiles. Part of the HLAC accreditation standards involves guidelines for the laundry facilities' design and ventilation.

For example, the HLAC accreditation standards require that the laundry facility must have functional separation of areas that receive, store or process soiled textiles from areas that process, handle, or store clean textiles. Approved methods of achieving this requirement include 1) providing a physical barrier which includes a negative air pressure in the soiled textile area with venting directly to the outside (i.e., positive air flow from the clean textiles area through the soiled textiles area, or 2) providing a functional barrier by negative air pressure in the soiled textile area and positive air flow from the clean textiles area through the soiled textiles area with venting directly to the outside. Further, the ventilation of the clean textile staging and storage area must be under positive air pressure relative to adjacent spaces to prevent intrusion of contamination from the soiled textile areas.

Accordingly, there exists a need for a handling system that serves to increase efficiencies in handling flexible articles and bundling them together for removal from a commercial or industrial setting. There is also a need for providing a sanitary/infection controlled environment during a waste collection operation that vents to the outside through the use of a negative air pressure in a soiled textile area.

BRIEF DESCRIPTION OF THE DRAWINGS

The features and inventive aspects of the present disclosure will become more apparent upon reading the following detailed description, claims, and drawings, of which the following is a brief description:

DETAILED DESCRIPTION

Referring now to the drawings, preferred embodiments of the present disclosure are shown in detail. Although the drawings represent embodiments of the present disclosure, the drawings are not necessarily to scale and certain features may be exaggerated to better illustrate and explain the present disclosure. The embodiments set forth herein are not intended to be exhaustive or otherwise limit the disclosure to the precise forms disclosed in the following detailed description.

Figure 3A:
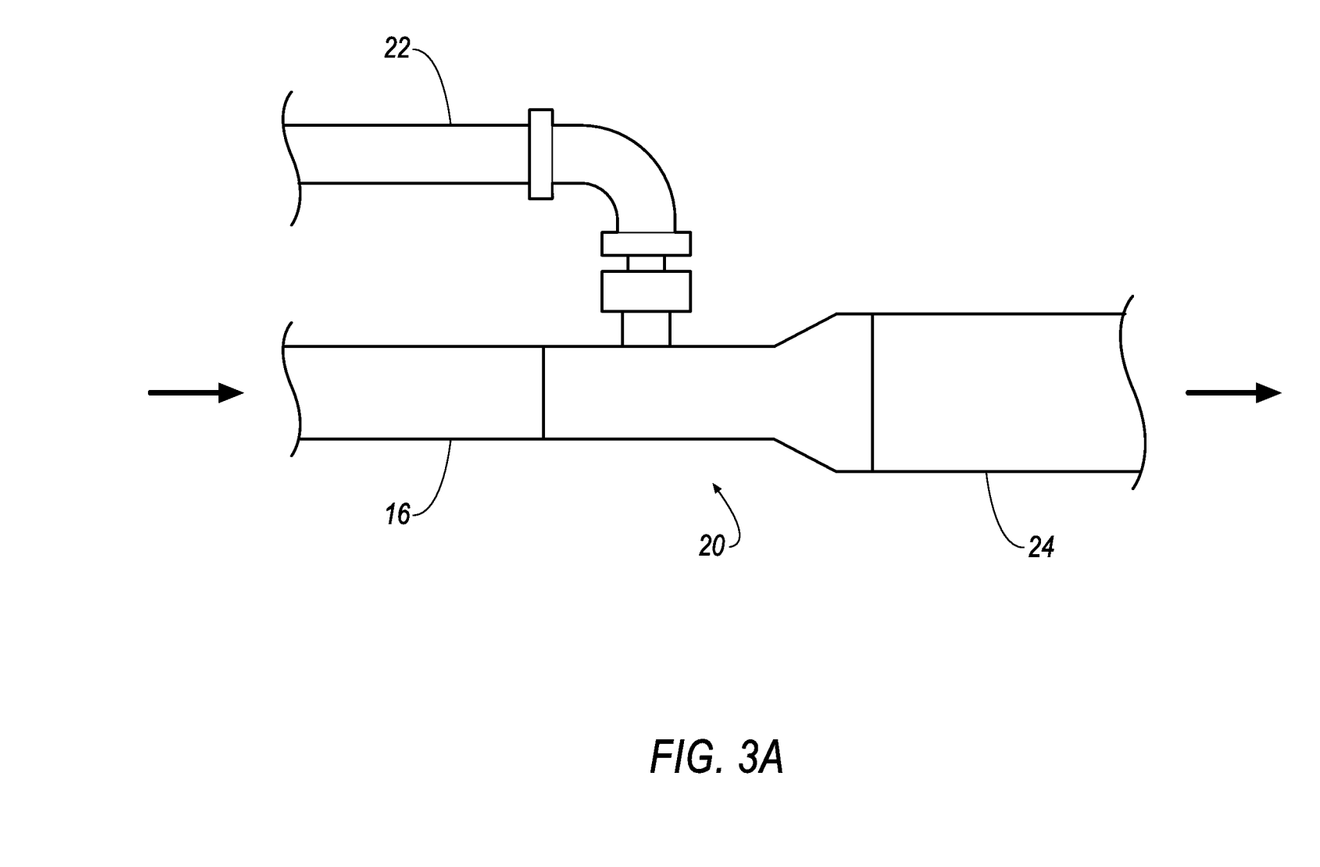
FIG. 3A is a top view of a portion of the intake end of the material handling system of FIG. 1, taken from encircled area 3A of FIG. 1.
Figure 3B:
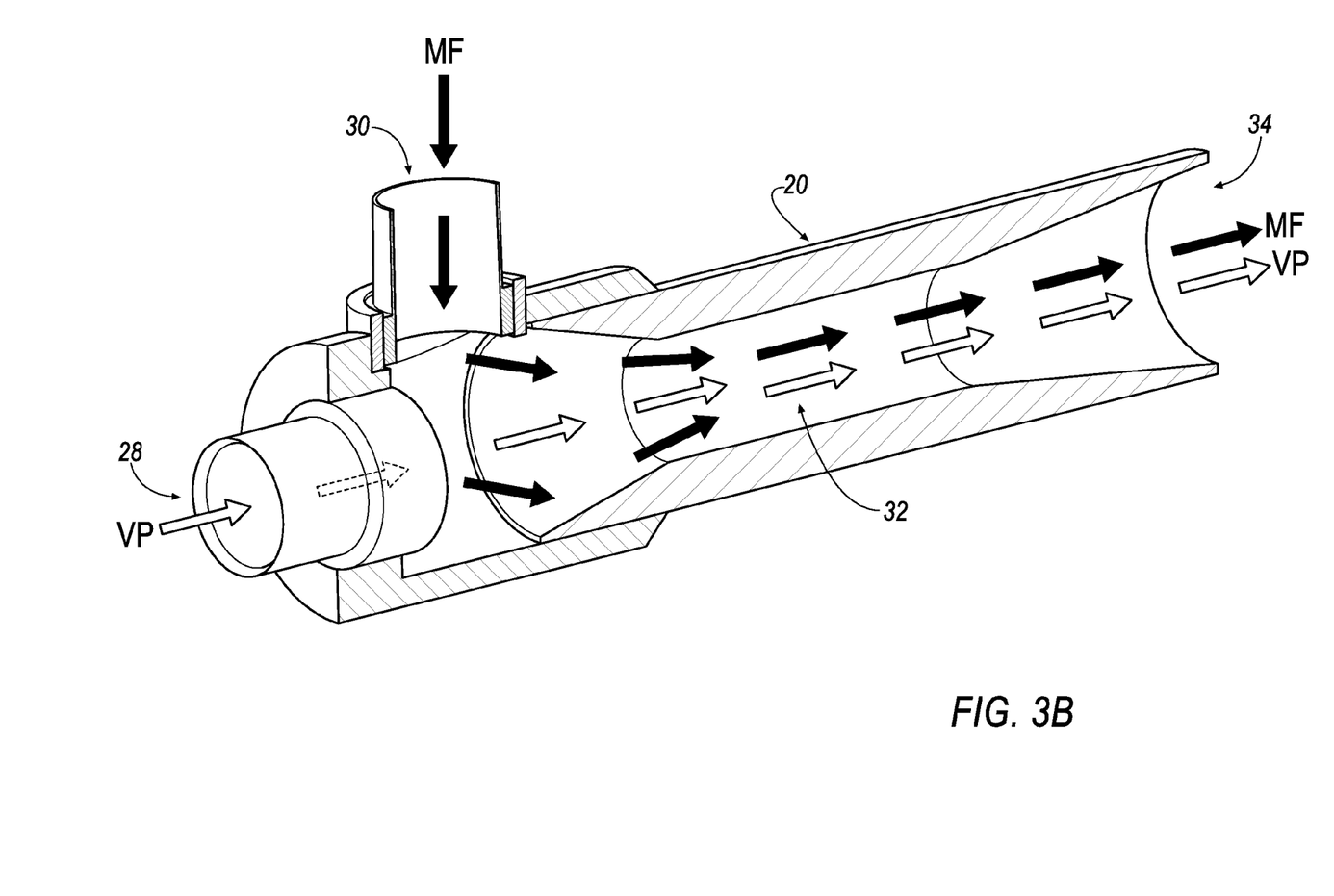
FIG. 3B is a cross-sectional view of the venturi unit of FIG. 1.
Figure 4:
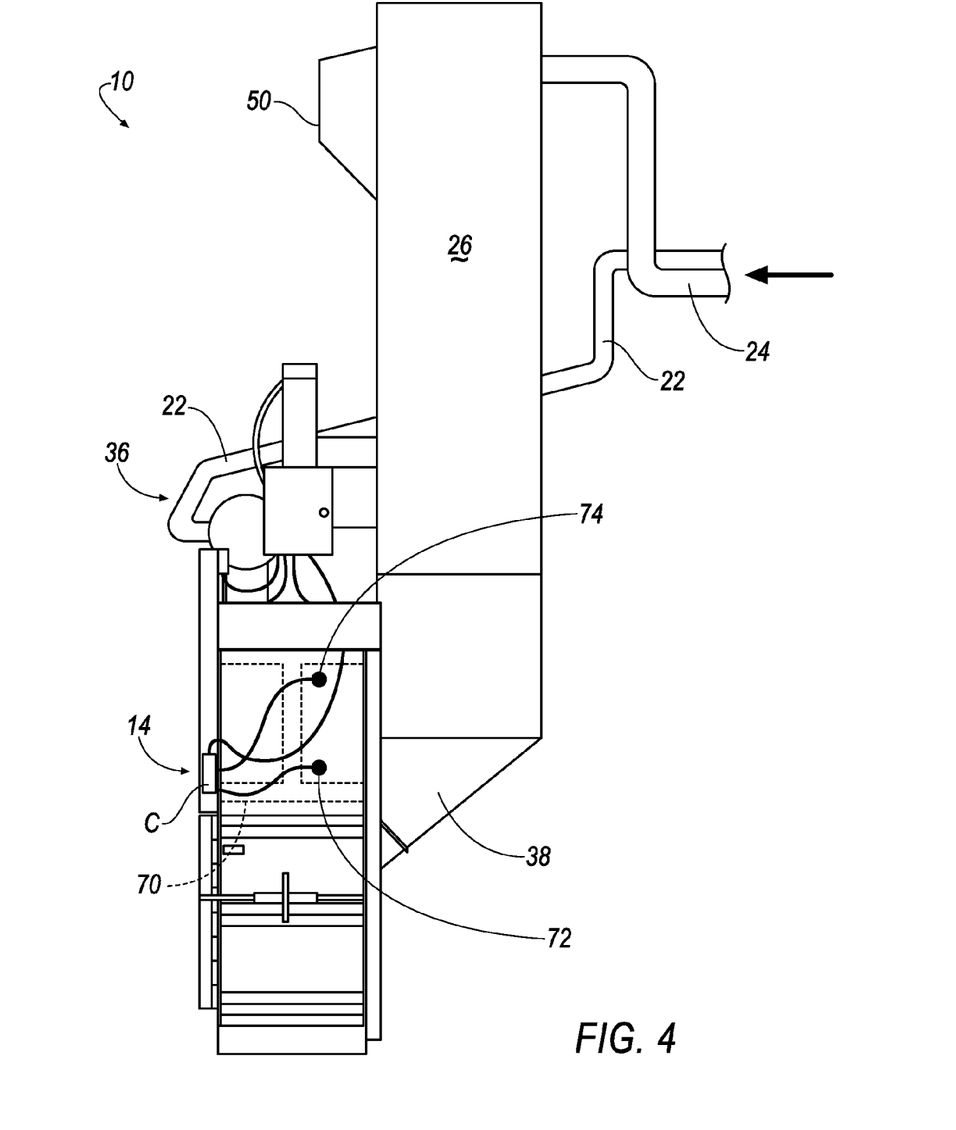
FIG. 4 is a side elevational view of an exhaust end of a material handling system.
Figure 5:
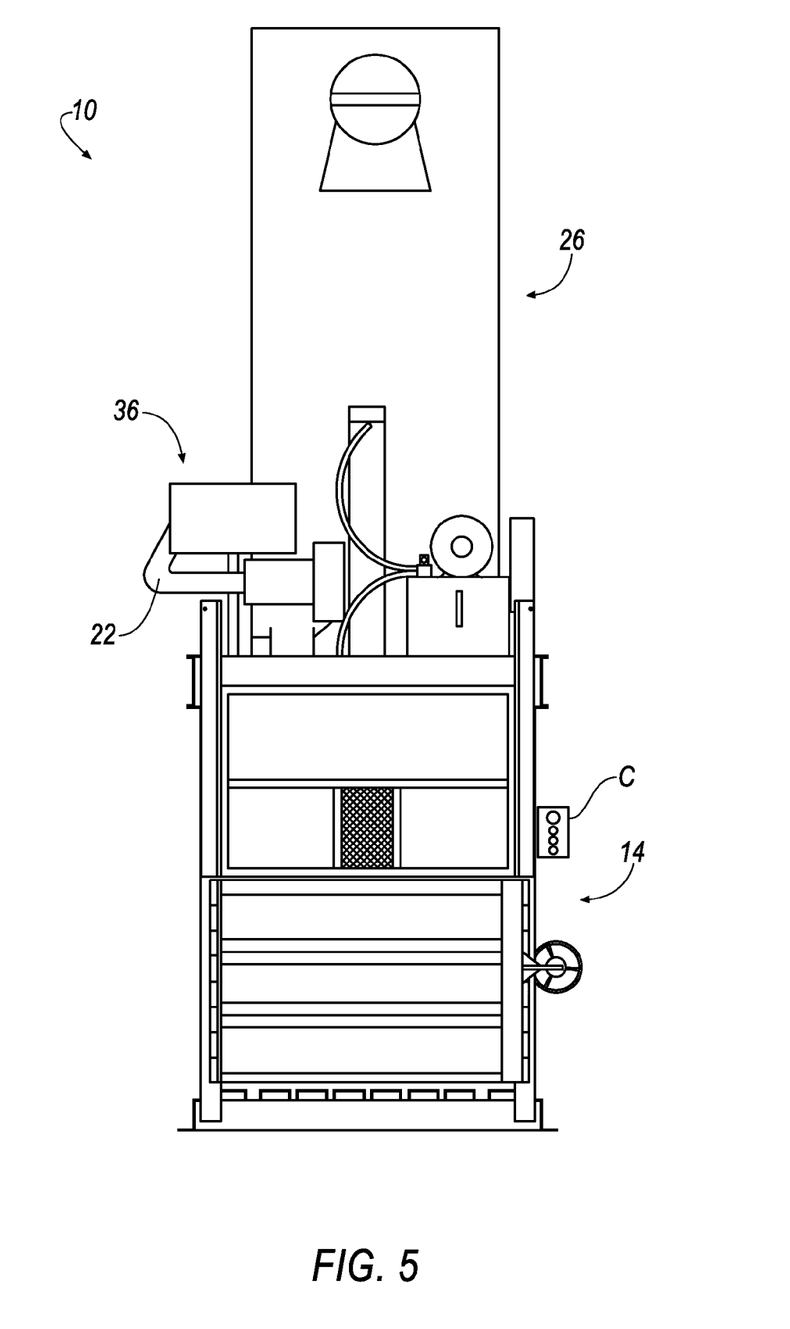
FIG. 5 is a front elevational view of the exhaust end of the material handling system.

Disclosed herein is a material handling system 10 for handling and transporting flexible articles 12 to a baler 14 (best seen in FIGS. 4-6), while minimizing human contact with the flexible articles 12 and efficiently packaging the flexible articles 12 by the baler 14. In one exemplary arrangement, system 10 includes at least one first delivery conduit 16 that extends from one or more inlets 18 (see FIGS. 1-3B) to a venturi unit 20 (FIGS. 3A-3B), a motive fluid supply conduit 22 (FIG. 3A) operatively connected to the venturi unit 20, a second delivery conduit 24 extending from an outlet of the venturi unit 20, and a material collector unit 26 (see FIG. 6). While the FIGS. in the present disclosure illustrate that the material handling system 10 is embodied with two inlets 18, it is understood that more than two inlets may be provided. It is also understood that a single product inlet 18 may be provided.

Figure 3C:
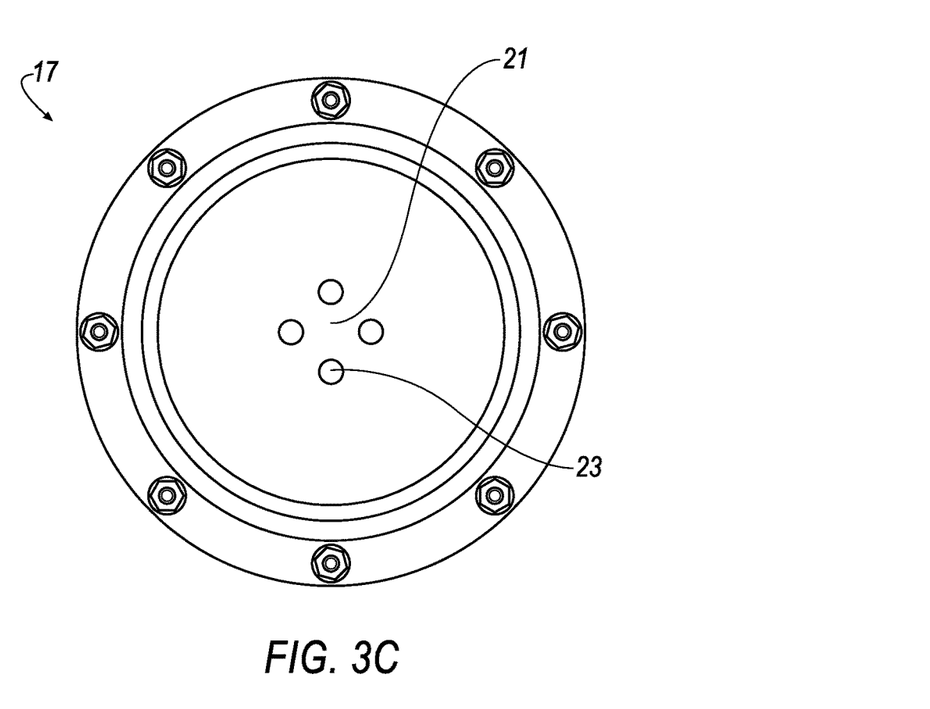
FIG. 3C is a plan view of an intake valve with a closing plate in a closed position.
Figure 3D:
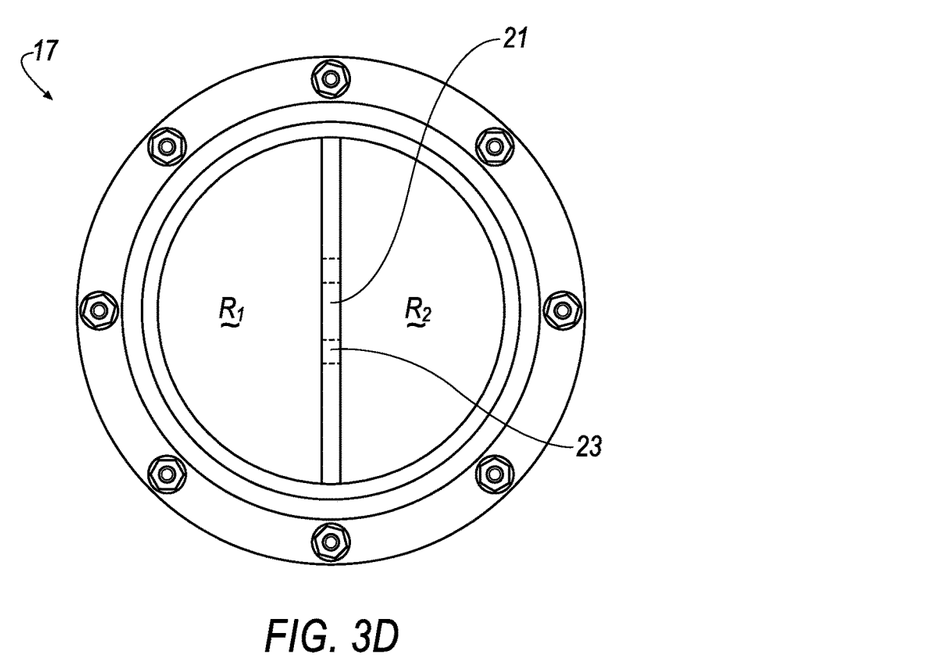
FIG. 3D is a plan view of the intake valve of FIG. 3C with the closing plate in an open position.

Disposed within the first delivery conduit 16 is an intake valve 17. In one exemplary arrangement an intake valve 17 is disposed in proximity to each product inlet 18. Details of an exemplary intake valve 17 are illustrated in FIGS. 3C-3D.

The intake valves 17 are configured to open or close a pathway P through the delivery conduit 16. For example, when the intake valve 17 is in an opened configuration, flexible articles 12 may travel through the delivery conduit 16. When the intake valve 17 is in a closed configuration, the flexible articles 12 may not pass the intake valve 17 within the delivery conduit 16. FIG. 3C illustrates a plan view of an exemplary arrangement of an intake valve 17 in the closed configuration. Each intake valve 17 includes a closing plate 21 that is configured to pivot between an open position and closed position. In the closed position, the closing plate 21 is oriented to be generally perpendicular to a pathway P extending through the conduit 16. In the open position, the closing plate 21 is pivoted such that the closing plate 21 is oriented to be substantially parallel with the pathway P extending through the conduit 16. In this manner, the pathway P will be bisected in the valve between first and second regions $R_1$ and $R_2$, both of which are sufficiently large enough for the flexible articles 12 to pass through.

Each closing plate 21 may further be provided with one or more small openings 23. Openings 23 allow for air to pass through valve 17 even with in the closed position. The small openings 23 are small enough to limit the amount of vacuum experienced at the inlets 18 when in a closed position, while still permitting pressurization of the conduit 16 in the case of a blockage. Without the valve 17, pressurization of the conduit 16 to clear a blockage would result in the system 10 exhausting at the inlets 18.

The intake valves 17 may further be operatively connected to a sensor 15. The sensor 15 is positioned adjacent to a product inlet 18. In one exemplary arrangement, the sensor 15 is configured as an optical sensor to read when a flexible article 12 has been presented to the product inlet 18. If the flexible article 12 is present, the sensor, which is operably connected to a controller C (shown mounted on material collector unit 26), will activate the closing plate 21 to pivot from a closed position to the open position, thereby delivering vacuum to the product inlet 18 and opening first and second regions $R_1$ and $R_2$ in pathway P. Sensor 15 and valve 17 may be operatively connected to the controller C using suitable wiring or suitable transmitters. After a predetermined time period, if no flexible article has been fed into product inlet 18, sensor 15, in cooperation with controller C, will trigger closing plate 21 to pivot back to the closing position.

In the event of a blockage in the system 10, including within the delivery conduits 16 and 24, valve 17 may be triggered to pivot closing plate 21 into the closed position. More specifically, a pressure sensor 25 may be mounted within the first delivery conduit 16 to monitor pressure of the system 10 downstream of the venturi unit 20. More specifically, a blockage in the system 10 may cause the product inlet 18 to become pressurized. In other words, if the vacuum pressure falls below a threshold level in the first delivery conduit 16, which would indicate a blockage in the system 10, the sensor 25 can trigger the valve 17 to pivot the closing plate 21 to the closed position, until the blockage has been cleared.

The venturi unit 20 includes a venturi inlet 28, a motive fluid inlet 30, a diffuser throat 32, and a product outlet 34. Motive fluid MF (represented by solid arrows MF) under high pressure is introduced into the motive fluid inlet 30, thereby creating a vacuum pressure VP at the venturi inlet 28 (represented by arrow outlines VP). A regenerative blower 36 (See FIGS. 4-5) may be used to generate a motive fluid stream. A suitable venturi that may be used with the present system is available from Converter Accessory Corp. of Wind Gap, Pa. The motive fluid is converted into high velocity as the high pressure fluid is directed through the diffuser throat 32, which has a smaller diameter the venturi inlet 28 and the product outlet 34. The high velocity motive fluid MF serves to push the flexible articles 12 through the second delivery conduit 24 and into the material collector unit 26. This design eliminates issues with vacuum systems, which tend to clog, and require vents disposed throughout the system. Moreover, the present system operates much more efficiently by using a regenerative blower instead of large vacuum motors required to pull material throughout the delivery conduits.

Figure 6A:
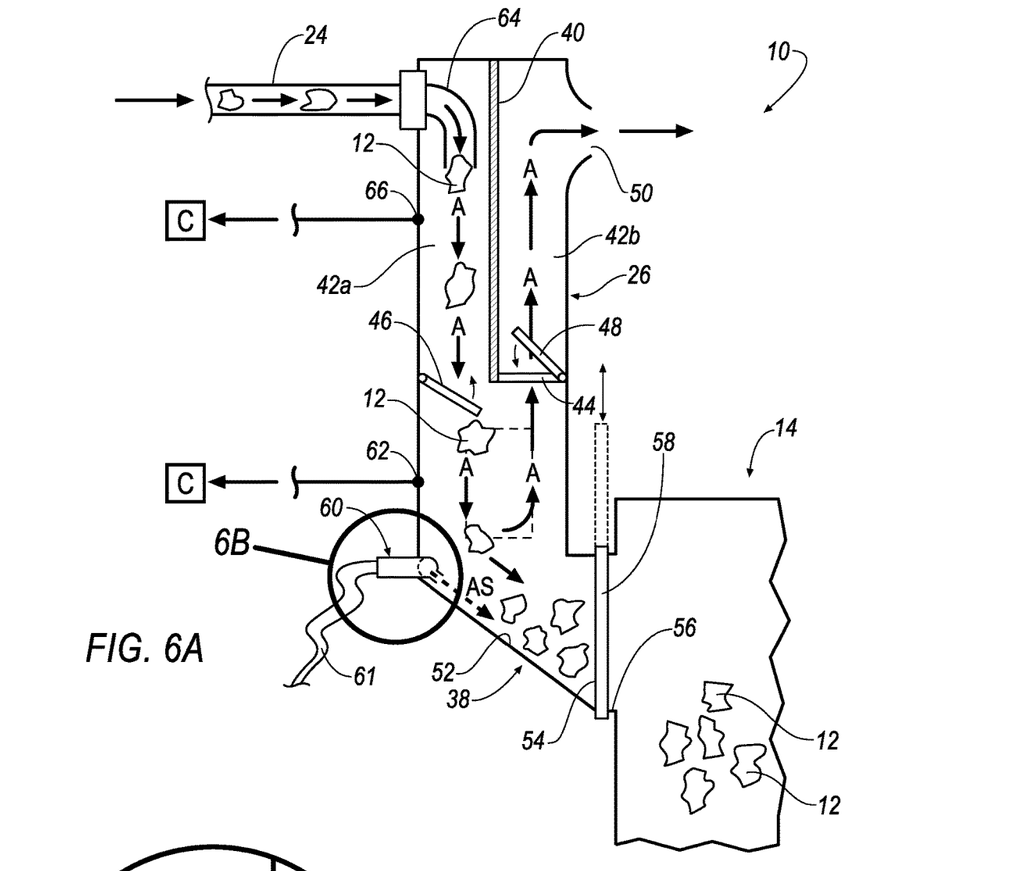
FIG. 6A is a cross-sectional view of a material collector unit of the material handling system.
Figure 6B:
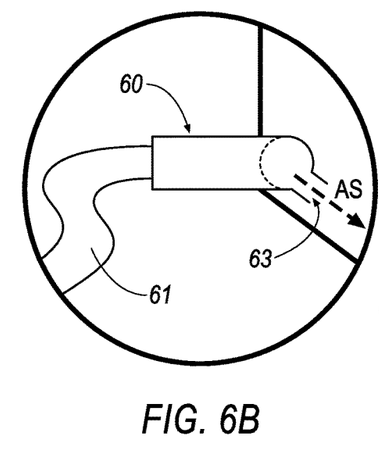
FIG. 6B is an enlarged view of area 6B in FIG. 6A.
Figure 6C:
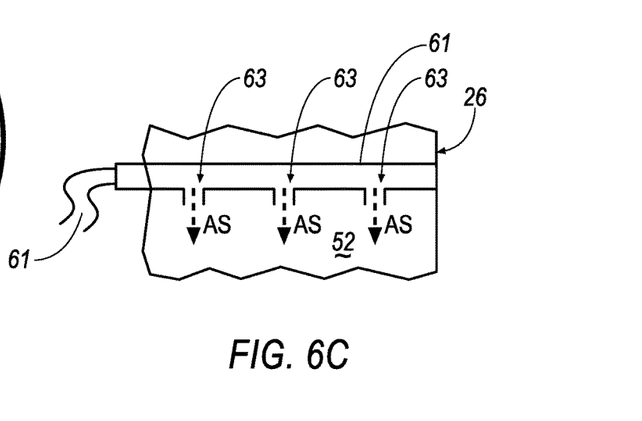
FIG. 6C is a partial elevational view of an air assist supply unit disposed within the material collector unit.

The second delivery conduit 24 is directed into the material collector unit 26. Details of the material collector unit 26 may be seen in FIG. 6. The material collector unit 26 is configured as an elongated duct with an angled accumulation bin 38 being disposed at the bottom of the duct. Within the duct, a perforated separator 40 partially bisects the duct into first and second sections 42a, 42b. More specifically, one end of the perforated separator 40 is secured to a top of the duct and the separator 40 extends downwardly a predetermined distance above the accumulation bin 38. The function of the perforated separator 40 will be discussed in further detail below. A screen 44 is connected to the end of the perforated separator 40 and to the wall of the duct. The screen 44 thus operates as a fixed barrier for second section 42b.

The material collector unit 26 further includes first and second gates 46, 48. The first gate 46 is movably mounted adjacent the bottom end of the perforated separator 40 on the first section 42a side of the duct. The first gate 46 is configured to selectively open to allow the flexible articles 12 to be directed into the accumulation bin 38, as will be explained in further detail below.

The second gate 48 is movably mounted adjacent the bottom end of the perforated separator 40 on the second section 42b of the duct. The second gate 48 is configured to selectively open to allow additional venting of the motive fluid through an exhaust opening 50, as will be explained in further detail below. In one exemplary arrangement, the exhaust opening 50 may include a hepa filter disposed therein (not shown).

The accumulation bin 38 is disposed at the bottom of the duct and is configured to allow for airtight sealing when the first and second gates 46, 48 are closed. The accumulation bin 38 includes an angled surface 52, which serves as a gravity feed toward an opening 54. In one exemplary arrangement, surface 52 is disposed at an angle of at least 70°. The opening 54 is configured to mate with an opening 56 formed on the baler 14. While FIG. 6 illustrates the opening 54 being mated with an opening 56 disposed in the rear of the bale 14, it is understood that the accumulation bin 38 may be attached and mated to a front opening of the baler 14 without departing from the disclosure. Thus, in part, the accumulation bin 38 serves to direct the flexible articles 12 into the baler 14, once a sufficient amount of the flexible articles 12 have been collected therein. A third gate 58 separates openings 56 and 54. For example, when the baler 14 is compacting the flexible articles, the third gate 58 will be in the closed position, as shown in FIG. 6 in solid lines. However, when the baler 14 is actively being filled with material, the third gate 58 will be in the open position, as represented in phantom. The third gate 58 will also be in the closed position during loading/collecting of the flexible articles 12 in the accumulation bin 38, prior to directing the flexible articles 12 into the baler 14 for compaction.

To assist with directing the flexible articles 12 to the baler 14, the accumulation bin 38 may further include an assist air supply unit 60. In one exemplary configuration, the assist air supply unit 60 includes a section of tubing 61 that is operatively connected to air supply source (not shown). The tubing 61 extends through a small opening in the material collector unit 26, at the top of the angled surface 52 of the accumulator bin 38. The tubing 61 is positioned at least substantially across the top of the angled surface 52. A plurality of small openings 63 in the tubing (See FIG. 6C) operate to direct air AS in a downward direction, toward or along the angled surface 52. The air assist supply unit 60 thus serves to blow the flexible articles 12 down the angled surface 52 toward the baler 14. To comply with sanitary standards, the assist air supply unit 60 is configured to deliver non-contaminated air to the baler 14. While described as a single piece of tubing 61, it is understood that multiple pieces of tubing may be used, with appropriate fittings connecting the tubing together without departing from the disclosure.

The material collection unit 26 further includes at least one sensor 62 mounted in the duct to control operation of the various gates 46, 48 and 58 while not placing anyone in direct contact with the flexible articles 12. This feature is particularly useful in hospital settings where the flexible articles 12 may be contaminated with bacteria or infectious diseases. For example, in one exemplary arrangement, an optical sensor 62 may be positioned below the perforated separator 40 and above the accumulation bin 38. As flexible articles 12 are collected in the accumulation bin 38, the sensor 62 will read when a sufficient amount of flexible articles 12 have been collected for efficient baling. At that time, the sensor 62 will send a signal to the controller to trigger when the gates 46, 48, and 58 are operated to ensure that an optimum number of flexible articles 12 are baled together in an efficient manner, as will be explained below.

Additional sensors that are operatively connected to a controller C to control operation of the system 10 are also contemplated. For example, high stack sensor 66 is positioned within the first section 42a of the material handling unit 26, below the outlet of the delivery conduit 24, but above the first gate 46. High stack sensor 66 is operable to determine if the flexible articles 12 have backed up into the first section 42a.

Figure 7A:
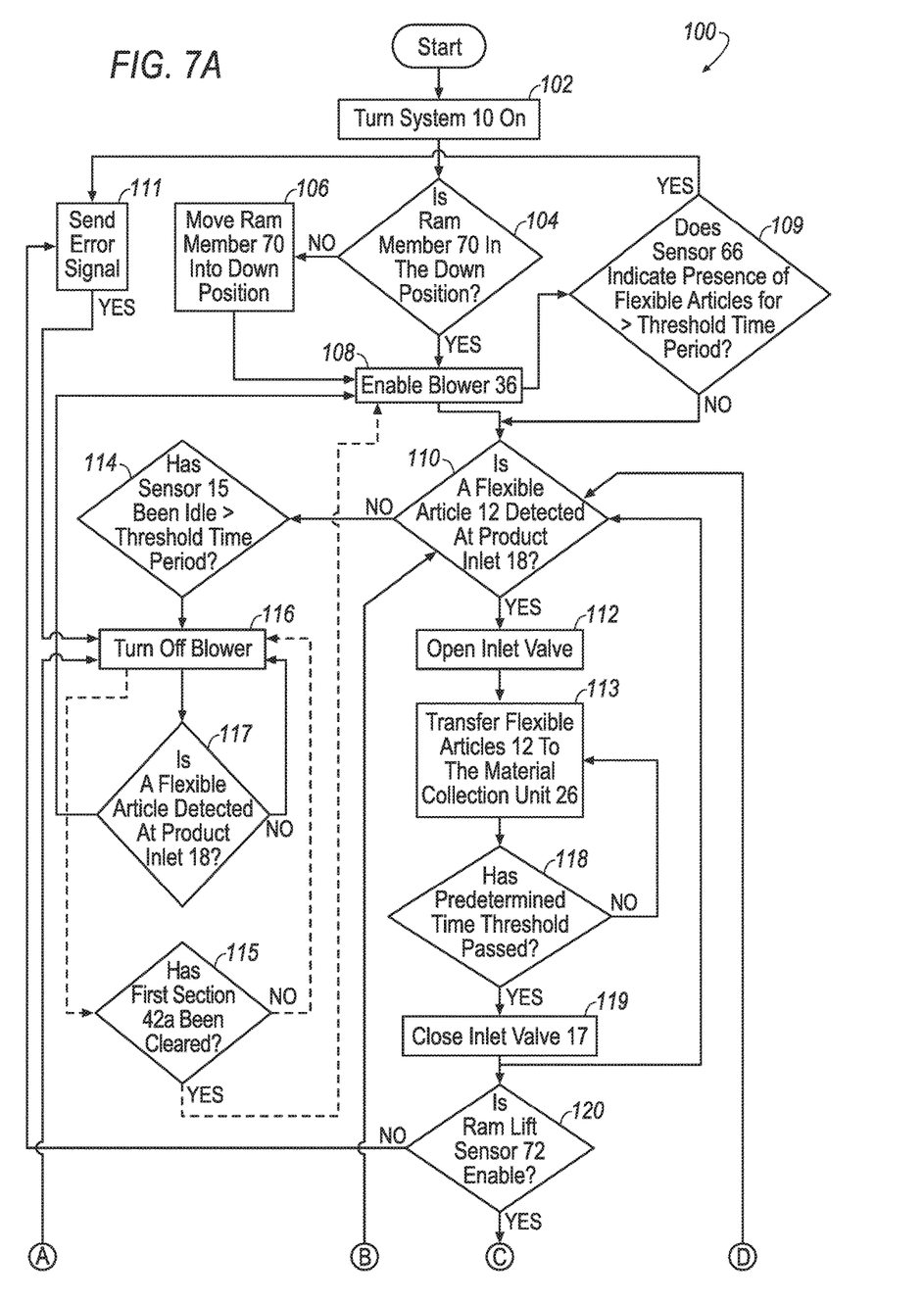
FIGS. 7A and 7B represent a flow chart illustrating the operation of the material handling system.
Figure 7B:
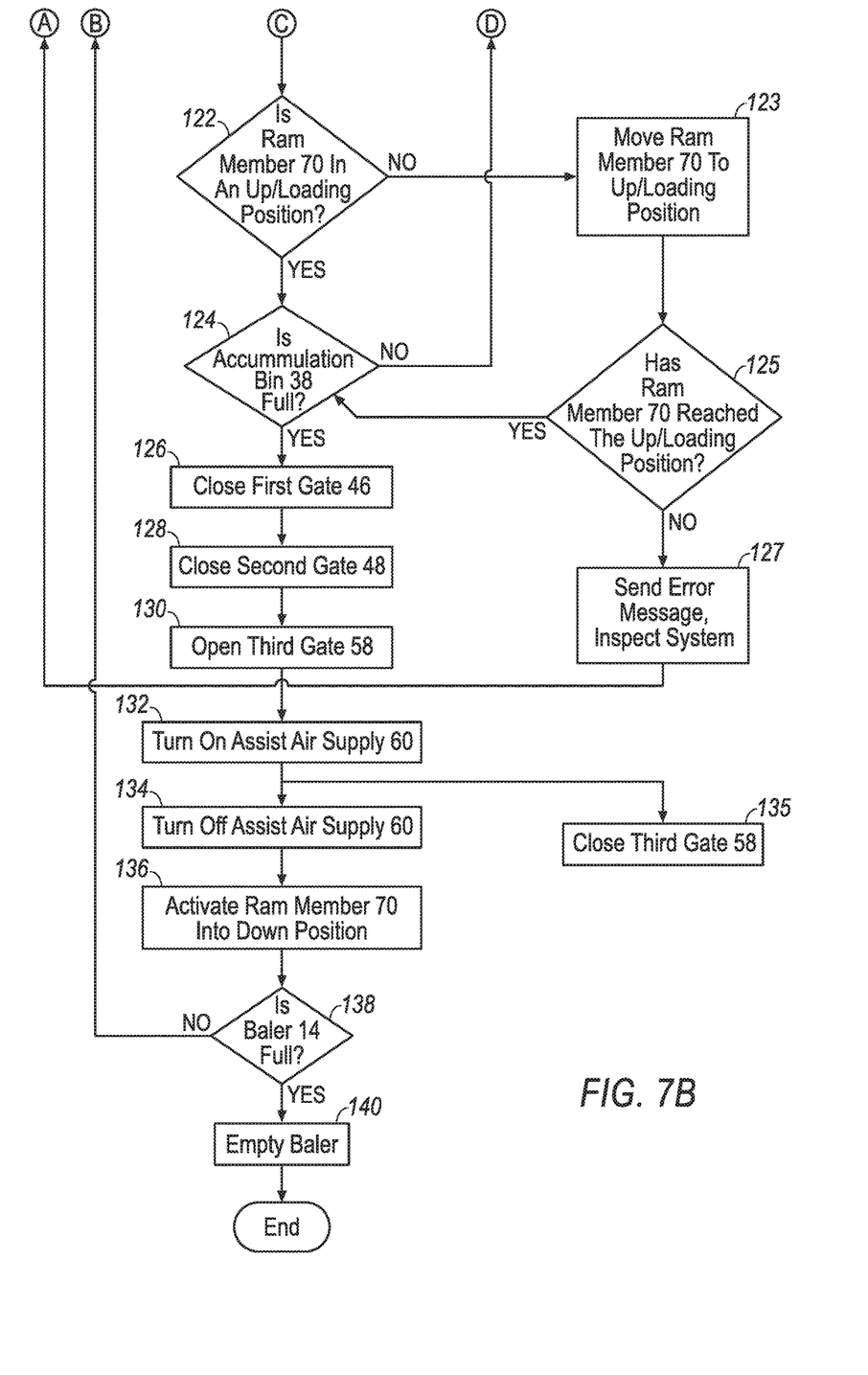

The operational process 100 of the system 10 will now be described with reference to the flow chart set forth in FIGS. 7A-7B combined. To begin, when it is desired to collect flexible articles 12, the process 100 begins by turning system 10 on at step 102. Once the system 10 is activated, in step 104 the controller determines whether or not a ram member 70 (best seen in phantom in FIG. 4) in the baler 14 is in the down/compacting position. To this end, a position sensor 72 may be mounted to the baler 14 to read whether the ram member 70 is in down/compacting position or the up/loading position. If the ram member 70 is not in the down position, the controller activates the ram member 70 to move into the down position in step 106. If the ram member 70 is in the down position, the process continues to step 108. Positioning the ram member 70 in the down position serves to maintain any flexible articles 12 present in the baler 14 in a compressed stated, as the flexible articles 12 may expand if not compressed.

Once the ram member 70 is in the down position, in step 108 the blower 36 is activated. Activating the blower 36 introduces motive fluid into the venturi unit 20. As discussed above, with this arrangement a vacuum is created at the venturi inlet 28, and through the delivery conduit 16.

Figure 1:
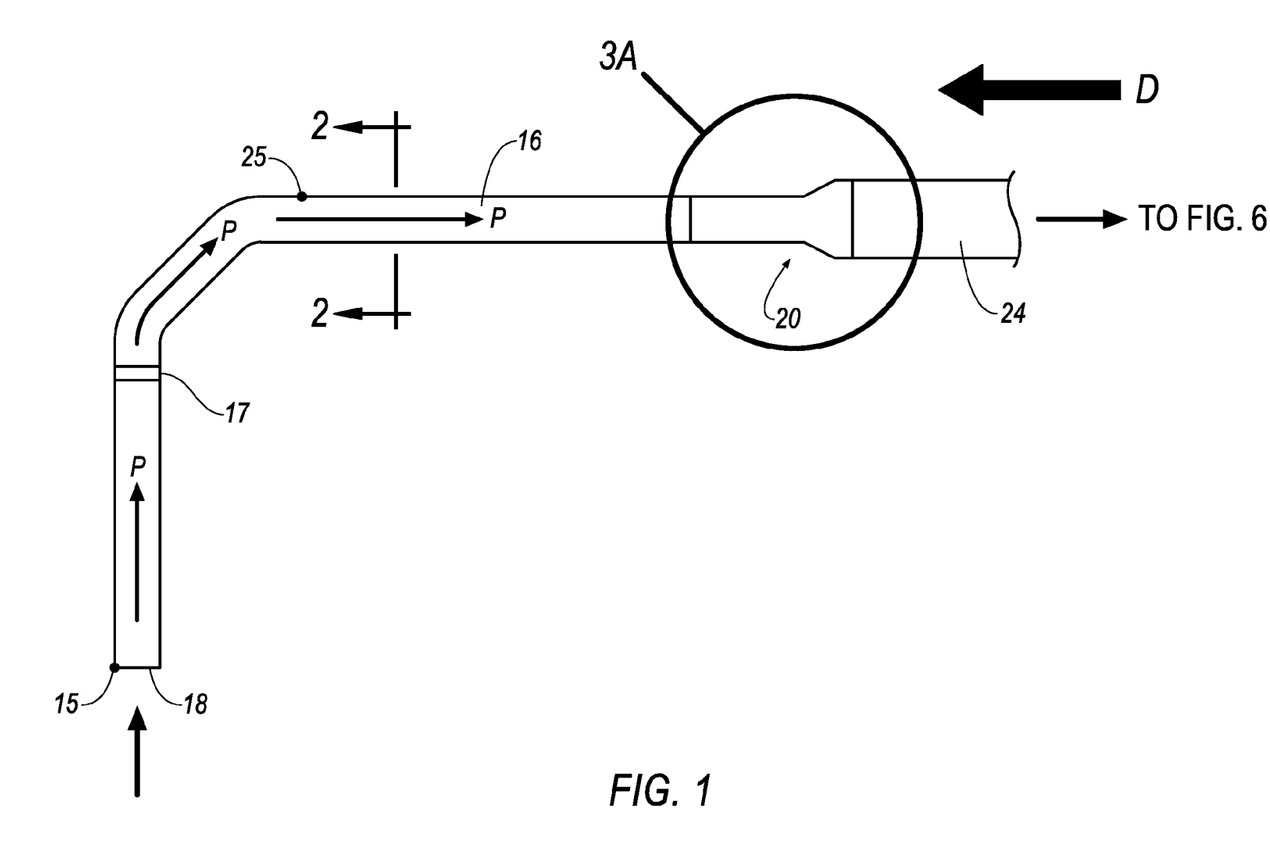
FIG. 1 is a side elevational view of an intake end of a material handling system.
Figure 2:
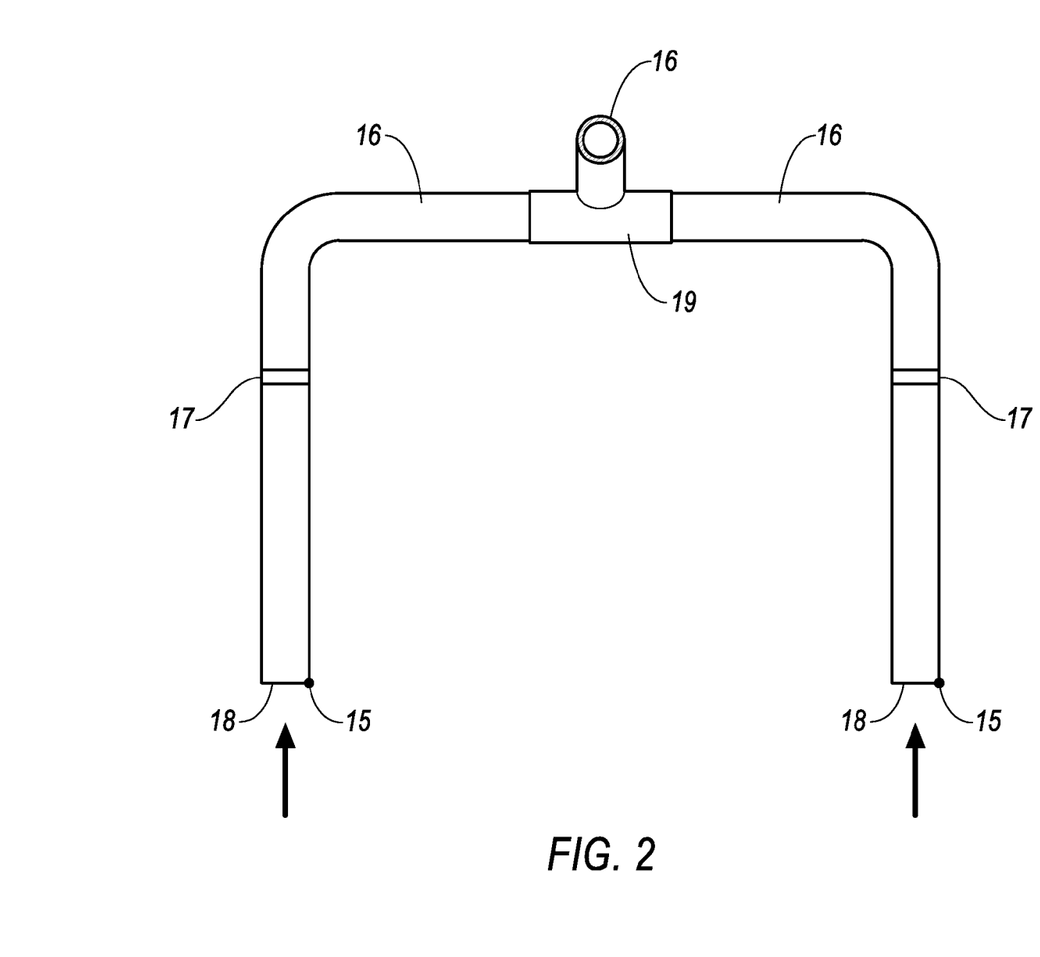
FIG. 2 is an elevational view of the intake end of the material handling system of FIG. 1, taken from the direction indicated by arrow D in FIG. 1.

Once the blower 36 has been activated, at step 110, the controller determines whether a flexible article 12 is present at the product inlet 18 based on a signal received from the sensor 15. If a flexible article 12 is present at the product inlet 18, the controller will open the inlet valve 17 in step 112. With the inlet valve 17 in an open position, the flexible articles 12 will be drawn up into the product inlet 18 that is operatively connected to the first delivery conduit 16. While the disclosure has been described in the context of a single product inlet 18 feeding into a single venturi unit 20, it is understood that other inlet arrangements are contemplated. For example, in one exemplary configuration, as best seen in FIG. 2, there are two inlets 18 that are joined together by a T-shaped coupling 19. It is understood however, that any number of inlets may be employed, without departing from the disclosure. It is also understood that in addition to multiple inlets 18, the system 10 may include multiple venturi units 20 that are all connected to a single material collector unit 26.

Once the flexible articles 12 reach the venturi unit 20, in step 113, the motive air supply will force the flexible articles 12 to be delivered through the second delivery conduit 24 to the material collection unit 26. While only one delivery conduit 24 is depicted, it is understood that multiple deliver conduits 24 may be connected to the material collection unit 26 without departing from the disclosure.

As best seen in FIG. 6, in one exemplary arrangement, the end of the delivery conduit 24 is angled to direct both the air flow, as well as the flexible articles 12 into the first section 42a of the material collector unit 26 and into the accumulator bin 38. More specifically, an elbow tube 64 may be mounted on the end of the second delivery conduit 24 to direct the material flow path by approximately 90°. The perforated separator 40 also assists in directing the flexible articles 12 and the motive fluid A in this manner.

Returning to step 110, the controller determines whether the sensor 15 has detected any flexible materials 12 within a predefined time period/threshold. If no flexible articles 12 have been presented to the product inlet 18 for longer than the threshold time period, at step 116, the blower 36 will be turned off. In one exemplary arrangement, if the sensor 15 does not detect a flexible article 12 for a time period of at least 45 seconds, the blower 36 will be turned off in step 116. However, it is understood that other time periods of inactivity may be selected without departing from the disclosure. Once the blower 36 has been turned off, if a flexible article 12 is later detected by sensor 15 at the product inlet 18 (step 117), the process will return to the step 108 to enable the blower 36, otherwise the blower 36 will remain off.

In one exemplary arrangement, at step 118, the controller determines if a second predetermined time period has expired after flexible article 12 has been presented to the product inlet 18. If the second predetermined time period has expired, at step 119 the inlet valve 17 will close. In one exemplary arrangement, the inlet valve 17 will close after a delay of approximately 1 second. The process will return to step 110 if additional flexible articles 12 are presented to the product inlet 18.

As the flexible articles 12 are being delivered to the material handling unit 26, at step 120, the controller determines if the ram lift sensor 72 is enabled. If the sensor is enabled, the process 100 proceeds to step 122 where the controller verifies if the ram member 70 is in an up/loading position. If yes, the process proceeds to step 124, if not, the process proceeds to step 123.

At step 123, the controller C will trigger the ram member 70 to move to the up/loading position. The controller C will determine when the ram member 70 has reached the up/loading position via signals received from sensor 72 at step 125. Sensor 72 will indicate when the ram member 70 reaches the up/loading position. If no signal is received from the sensor 72 that the ram member 70 has reached the up/loading position after a predetermined time period, an error signal will issue at step 127. At this stage, the system 10 should be inspected and the process will return to step 116, whereby the blower 36 will be turned off.

During operation of system 10, the first gate 46 is normally open, as shown in FIG. 6, such that the flexible articles 12 will drop down into the accumulation bin 38. The third gate 58 will normally be in the closed position, so that a sufficient number of flexible articles 12 may accumulate/collect within the accumulation bin 38. However, the second gate 48 will also be open and the motive air A will proceed to travel up through the screen 44, into the second section 42b and out exhaust opening 50. However, the screen 44 serves to prevent any of the flexible articles 12 from moving into the second section 42b, while permitting the motive fluid to pass through.

At step 124, it is determined whether the accumulation bin 38 is in a full condition. More specifically, sensor 62, which may be an optical sensor, detects if a sufficient number of flexible articles 12 are present in the accumulation bin 38 for an efficient baling operation. If a sufficient number of flexible articles 12 are present in the accumulation bin 38, the sensor 62 triggers the controller C to close the first gate 46 in step 126. In this position, the motive air will be able to pass through the perforated separator 40 to keep the system pressurized and able to continue to direct the flexible articles 12 through the system 10 and into the material collection unit 26. If the accumulation bin 38 is not full, the process 100 returns to step 110. The motive fluid in the accumulation bin 38 is also allowed to bleed off of the system after the first gate 46 is closed, as air may pass through the screen 44, when the second gate 48 is open. However, in step 128 the controller C will also trigger the second gate 48 to close a predetermined time period after the first gate 46 closes to facilitate the bleed off. In one exemplary arrangement, this predetermined time period is approximately 2 seconds. Once the second gate 48 closes, an air lock is created within the sealed off duct and accumulation bin 38.

The process 100 then proceeds to step 130, whereby the controller C triggers the third gate 58 to open such that openings 54 and 56 are in communication. At step 132, the assist air supply 60 may then be activated to push the flexible articles 12 into the baler 14. In one exemplary arrangement, the assist air supply 60 does not turn on until after a predetermined time period so as to enable the third gate 58 to be fully opened. In one specific embodiment, there is an 8 second delay between the start of the opening of the third gate 58 and activation of the assist air supply unit 60. The assist air supply unit 60 is configured to run for a length of time sufficient to ensure that all of the flexible materials 12 within the accumulation bin 38 have been blown through openings 54 and 56 and into the baler 14. In one exemplary arrangement, the assist air supply unit 60 run time is approximately 25 seconds. After the assist air supply unit 60 run time has expired, at step 134, the assist air supply unit 60 will turn off.

However, before the assist air supply unit 60 is turned off at step 134, the controller C will close the third gate 58 at step 135. With this arrangement, it is ensured that all of the flexible articles 12 that were in accumulation bin 38 were pushed into the baler 14 through aligned openings 54, 56. After the third gate 58 is closed, at step 134, the assist air supply unit 60 is turned off.

At step 136, the ram member 70 in the baler 14 is triggered to move into the down/compress position, thereby compressing the flexible articles 12 that were delivered from the accumulation bin 38 via the angled surface 52 and the assist air supply unit 60. At step 138, the controller C determines if the baler 14 is full. More specifically, the controller C will determine if a sensor 74 positioned within the baler 14 indicates a "full baler" 14 event. The sensor 74 may be any suitable sensor, but in one exemplary configuration, sensor 74 is an optical sensor. If the sensor 74 indicates that the baler 14 is full, the process 100 then proceeds to step 140, whereby the baler 14 is emptied. However, if the sensor 74 does not indicate that the baler 14 is full, the process 100 returns to step 110.

Once the flexible articles 12 have been delivered to the baler 14, the operation may continue, with the first and second gates 46, 48 being opened by virtue of the controller C, thereby allowing the accumulation bin 38 to fill once again with flexible articles.

To ensure against a backup of flexible articles 12 in the system 10, an additional sensor, i.e., high stack sensor 66 detects if the flexible articles 12 have backed up into the first section 42a of the material collection unit 26 at step 109. Step 109 is performed at any stage of the process after the blower 36 has been turned on. In other words, the first section 42a of the material collection unit 26 is being continuously monitored. More specifically, as flexible articles 12 will be passing sensor 66 during a normal operation, if sensor 66 detects the presence of flexible articles 12 for more than a predetermined time period, an indicator alerting a user to an operational error is triggered at step 111. The indicator can be any suitable indicator, such as an audible indicator, a visual indicator or a combination of both. Sensor 66 will also trigger the controller C to return to step 116 to turn blower 36 off until the operational error is fixed at step 115, at which time, the process 100 will need to begin anew at step 108.

The present disclosure has been particularly shown and described with reference to the foregoing embodiments, which are merely illustrative of the modes for carrying out the disclosure. It should be understood by those skilled in the art that various alternatives to the embodiments of the disclosure described herein may be employed in practicing the disclosure without departing from the spirit and scope of the disclosure as defined in the following claims. It is intended that the following claims define the scope of the disclosure and that the method and apparatus within the scope of these claims and their equivalents be covered thereby. This description of the disclosure should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A material collection unit, comprising:
   an elongated housing section;
   a separator disposed within the housing section and partially bisecting the elongated housing section into first and second sections, wherein the first section is in direct communication with an inlet for material to pass through in a first direction through the first section and wherein the second section is in communication with an exhaust to direct motive fluid in a second direction different than the first direction, through the second section;
   an accumulation bin disposed below the elongated housing, the accumulation bin having an open top section that is in communication with the elongated housing section and a second opening located adjacent a bottom portion of the accumulation bin;
   a first gate that is movably disposed at an end of the first section of the housing section, whereby the first gate may be selectively closed to close off the first section from the accumulation bin to prevent material from being deposited in the accumulation bin;
   a second gate that is movably disposed at an end of the second section of the housing section, whereby the second gate may be selectively closed while the first gate is closed to create an air lock within the accumulation bin; and
   a third gate that is movably disposed at the second opening of the accumulation bin to prevent materials from exiting the accumulation bin.

2. The material collection unit of claim 1, wherein the accumulation bin further includes an angled wall that is slanted downwardly toward the second opening.

3. The material collection unit of claim 2, wherein the angled wall is slanted so as to create at least a 70° angle.

4. The material collection unit of claim 2, wherein the second opening is formed in a side member of the accumulation bin so as to be oriented approximately 90° to the open top section.

5. The material collection unit of claim 2, wherein the separator extends a predetermined distance within the elongated housing section so as to create a chamber within the accumulation bin above the angled wall.

6. The material collection unit of claim 2, wherein the second opening is configured to mate with an opening of a baler unit.

7. The material collection unit of claim 1, further comprising a sensor that is disposed within the accumulation bin, wherein the sensor is configured to determine when the accumulation bin has collected a predetermined amount of material therewithin for efficient disposal.

8. The material collection unit of claim 7, wherein the sensor is operatively connected to a controller that is configured to shut the first gate when the accumulation bin has collected the predetermined amount of material.

9. The material collection unit of claim 8, wherein the controller is configured to shut a second gate that is movably disposed at the end of the section of the housing section, after the first gate has been closed.

10. The material collection unit of claim 9, wherein the controller is configured to open a third gate that is movably disposed at the second opening of the accumulation bin to permit the materials collected in the accumulation bin to exit the accumulation bin.

11. The material collection unit of claim 1, wherein the separator is perforated.

12. The material collection unit of claim 1, further comprising a screen that is disposed over an opening to the second section at an end of the second section, opposite the exhaust.

13. The material collection unit of claim 1, further comprising an air assist supply directed into the accumulation bin to push materials toward the second opening the accumulation bin.

* * * * *